(12) United States Patent
Chew et al.

(10) Patent No.: US 7,546,548 B2
(45) Date of Patent: Jun. 9, 2009

(54) METHOD AND SYSTEM FOR PRESENTING MENU COMMANDS FOR SELECTION

(75) Inventors: Chee H. Chew, Redmond, WA (US); Justin M. Maguire, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 852 days.

(21) Appl. No.: 10/187,195

(22) Filed: Jun. 28, 2002

(65) Prior Publication Data
US 2004/0001105 A1  Jan. 1, 2004

(51) Int. Cl.
*G06F 3/00* (2006.01)
(52) U.S. Cl. .................. 715/810; 715/835; 715/840; 715/843; 715/864
(58) Field of Classification Search .............. 715/810, 715/817, 835, 838, 840, 813, 843, 864
See application file for complete search history.

(56) References Cited

U.S. PATENT DOCUMENTS 5,805,167 A * 9/1998 van Cruyningen .......... 715/808
5,953,541 A * 9/1999 King et al. ................. 710/67
6,201,540 B1 * 3/2001 Gallup et al. ............... 715/764
6,262,717 B1 * 7/2001 Donohue et al. ............ 345/173
6,938,216 B1 * 8/2005 Ishisaki ..................... 715/817

* cited by examiner

*Primary Examiner*—Tadesse Hailu
*Assistant Examiner*—Michael Roswell
(74) *Attorney, Agent, or Firm*—Workman Nydegger

(57) ABSTRACT

A system and method on a computing device that significantly reduces the average time required to locate and select a desired command of the device. A two-dimensional menu (grid) of commands is provided, in combination with improved selection techniques including simultaneous hardware button usage. Pressing and holding a menu button causes display of the command menu, with the center, default item initially selected. A directional control button may be used to change the selection, and scroll the display if more commands are available than presently displayed. When the menu invoke button is released, the currently selected item is invoked, thereby rapidly enabling selection and invocation of a command. The method and system may be enhanced with a menu locking feature to facilitate single-handed command selection.

33 Claims, 12 Drawing Sheets

METHOD AND SYSTEM FOR PRESENTING MENU COMMANDS FOR SELECTION

FIELD OF THE INVENTION

The present invention relates generally to computer devices, and more particularly computer devices having displayed command menus.

BACKGROUND OF THE INVENTION

Designers of contemporary mobile computing devices, including pocket-sized personal computers, mobile telephones, pagers and the like, are challenged with trying to build devices of ever-decreasing size with ever-increasing features, all while providing a user interface that is sufficiently user-friendly to facilitate input. Alternative modes exist for obtaining user input, including a keyboard mode, wherein input is performed via keys, and a stylus mode, where the device is controlled by a stylus and a touch-sensitive display screen/input mechanism.

Each of these modes has advantages and disadvantages. For example, while the stylus mode is generally superior to keyboard modes for direct manipulation of displayed items, including traditional menu selection of commands and the like, the stylus mode is relatively slower than the keyboard mode for text input. This is true even with limited keyboards, such as those referred to as thumb keyboards.

As a result, some devices provide both stylus and keyboard input mechanisms, whereby that a user can use the stylus for command selection and the key buttons for text input. However, switching between using the keyboard and using the stylus is cumbersome, awkward and slow. Moreover, the stylus mode is not even possible on devices which are not touch-sensitive (e.g., most mobile telephones).

To contend with these problems, designers of devices that do not have touch-sensitive displays, such as many mobile telephones, and/or otherwise want to allow users to select commands via a keyboard mode, essentially simulate the stylus mode with keys. Selection is typically accomplished via up and down cursor buttons (and in some devices a scrolling wheel) for scrolling through a menu of vertically-arranged commands, starting at the top, along with a select button that the user actuates when the desired command is highlighted. While functional, on average this is relatively slow for a user to find and enter a command, and often results in the user scrolling past (overshooting) or stopping short of (undershooting) the desired menu item. What is needed is an improved way of facilitating the entry of commands via buttons/hardware keys.

SUMMARY OF THE INVENTION

Briefly, the present invention provides a system and method on a computing device that significantly reduces the average time required to locate and select a desired command of the device. This is accomplished by providing a two-dimensional menu (grid) of commands, in combination with improved selection techniques including simultaneous hardware button usage, referred to as hardware button chording. Pressing and holding a menu invoke button (or simply, menu button) causes display of the command menu, with the center, default item initially selected.

While the menu invoke button is depressed, a directional control (e.g., a directional pad, or dpad, arrow keys, or rocker) may be used to change the highlighted, pending selection. When the menu invoke button is released, the selected item is invoked. The combination of hardware button chording and the two-dimensional arrangement and selection of commands facilitates the rapid and simple menu selection of a large menu command set.

In one alternative embodiment, a two-dimensional menu such as a 3×3 grid of commands is displayed (or if already displayed, made active) by the user pressing and holding the menu key. Because the default command (e.g., the most commonly needed or most frequently used) is initially the highlighted command, the user can select the default command with a single menu button push and release. In a device with only horizontal and vertical directional buttons, that is, a four-way control, other commands (referred to as secondary commands) that are vertically or horizontally next to the default command can be selected by pressing only one directional control button. When selected, the menu button (and optionally the direction button) is then released to invoke the currently selected command. One command may be a cancel command so that the user can exit the menu without invoking a device function.

In a device having only horizontal and vertical directional buttons, tertiary commands may be positioned diagonally with respect to the centered default command. To be invoked, such tertiary commands require only two directional control button pushes, along with release of the menu button. Note that if the direction control were an eight-way (including diagonal) control, such diagonally placed commands would also be secondary commands, not tertiary commands.

The grid need not be symmetrical, and may be enlarged to accommodate larger menu sets, such as a 3×4, 4×4, 4×5 or a 5×5 grid. This may be accomplished by displaying the entire grid at once, or by scrolling only a subset menu of a larger grid into the display area.

In another alternative embodiment, a "menu lock" feature may be provided. For example, when the menu invoke command is depressed and held for a sufficient time without pressing any directional key, the menu becomes locked such that the release of the menu invoke command does not invoke the highlighted command, but rather acts to confirm entry into the menu lock mode (or has no further effect). Once the command menu is locked, which may be visually confirmed, the user may use the directional control to select a different item, and then press the menu invoke command again to actually perform the invocation. As can be appreciated, the menu lock mechanism facilitates single-handed command selection by allowing the menu button to be released without causing an action.

Other advantages will become apparent from the following detailed description when taken in conjunction with the drawings, in which:

Figure 4:
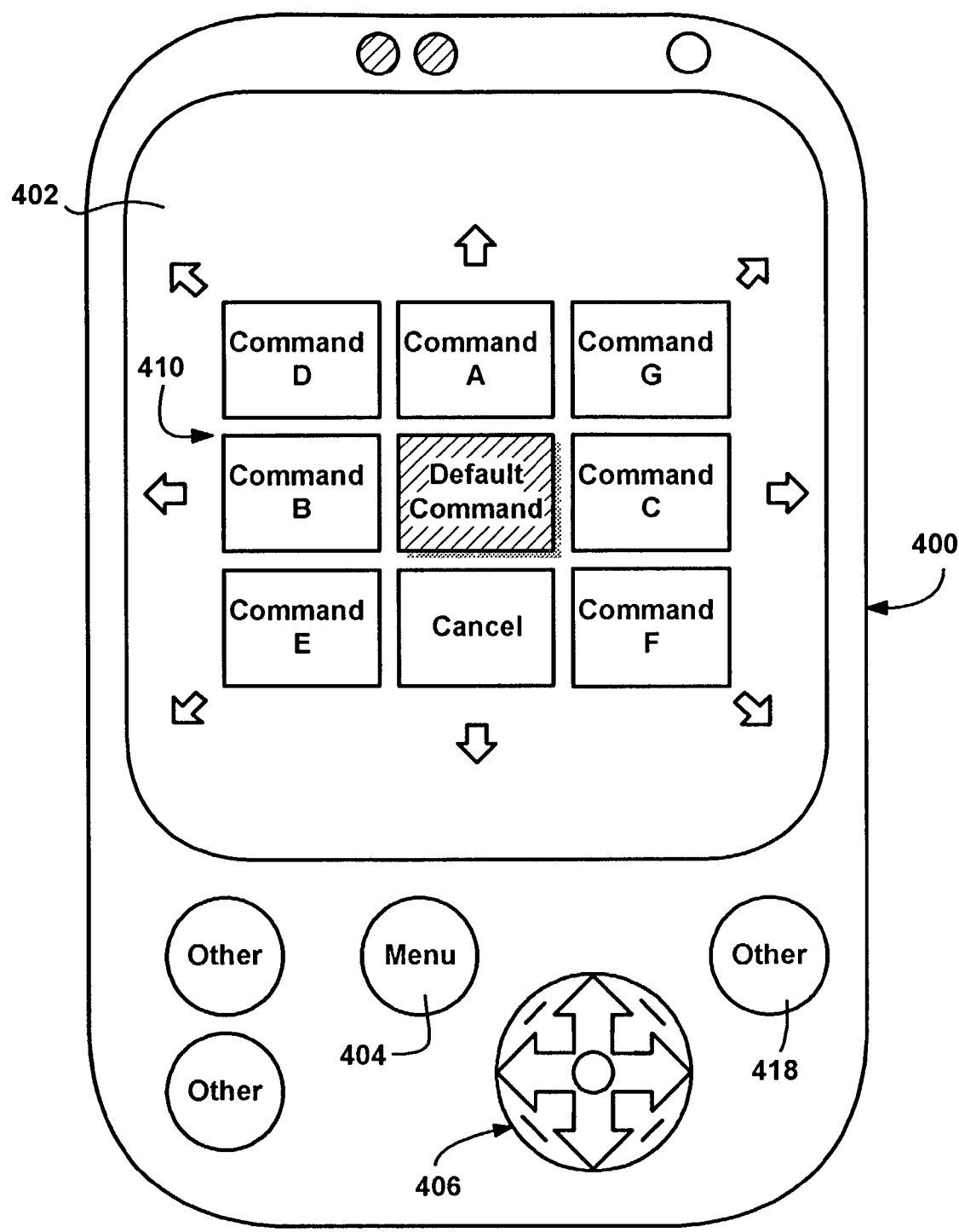
FIG. 4 is a simplified representation of a pocket-sized or handheld computing device constructed in accordance with an aspect of the present invention.
Figure 7:
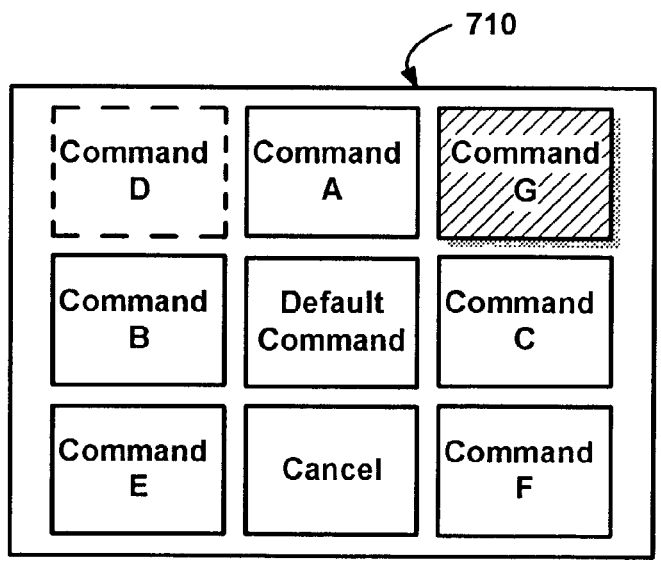
Figure 6A:
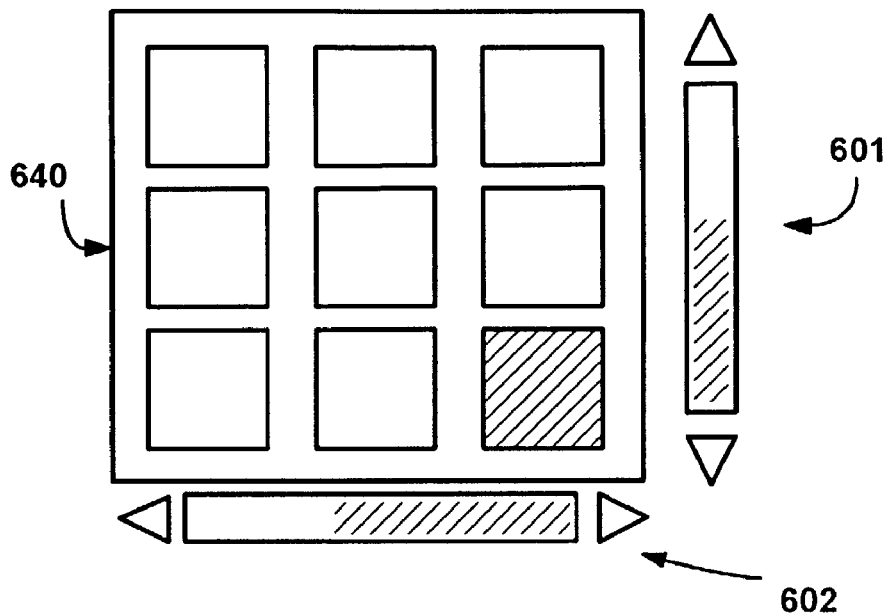
Figure 6B:
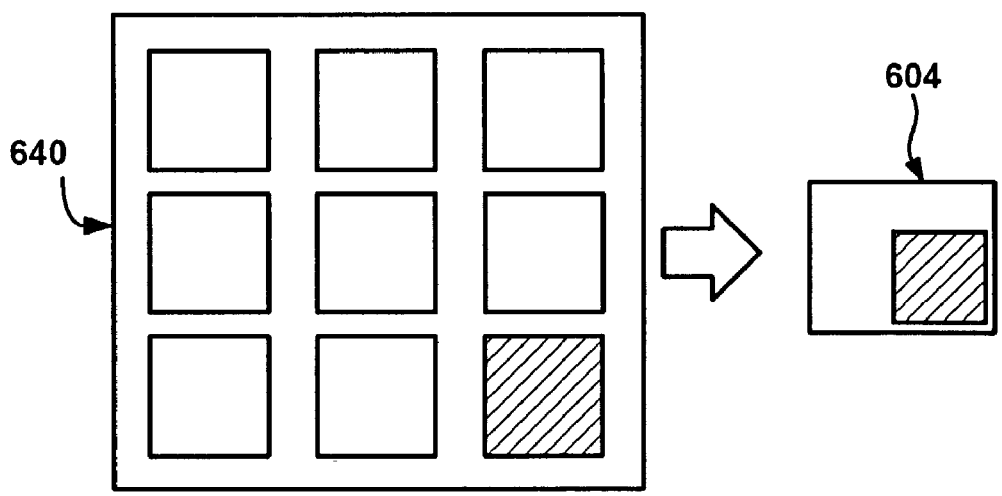

FIGS. 6A and 6B are representations of various mechanisms that can provide a visual indication to a user of where within an overall grid the user has scrolled to display a subset of commands, and/or to assist with navigation in the grid, in accordance with an aspect of the present invention;

FIG. 7 illustrates a grid after a diagonal button press altering the state of the grid illustrated in the computing device of FIG. 4.

Figure 8:
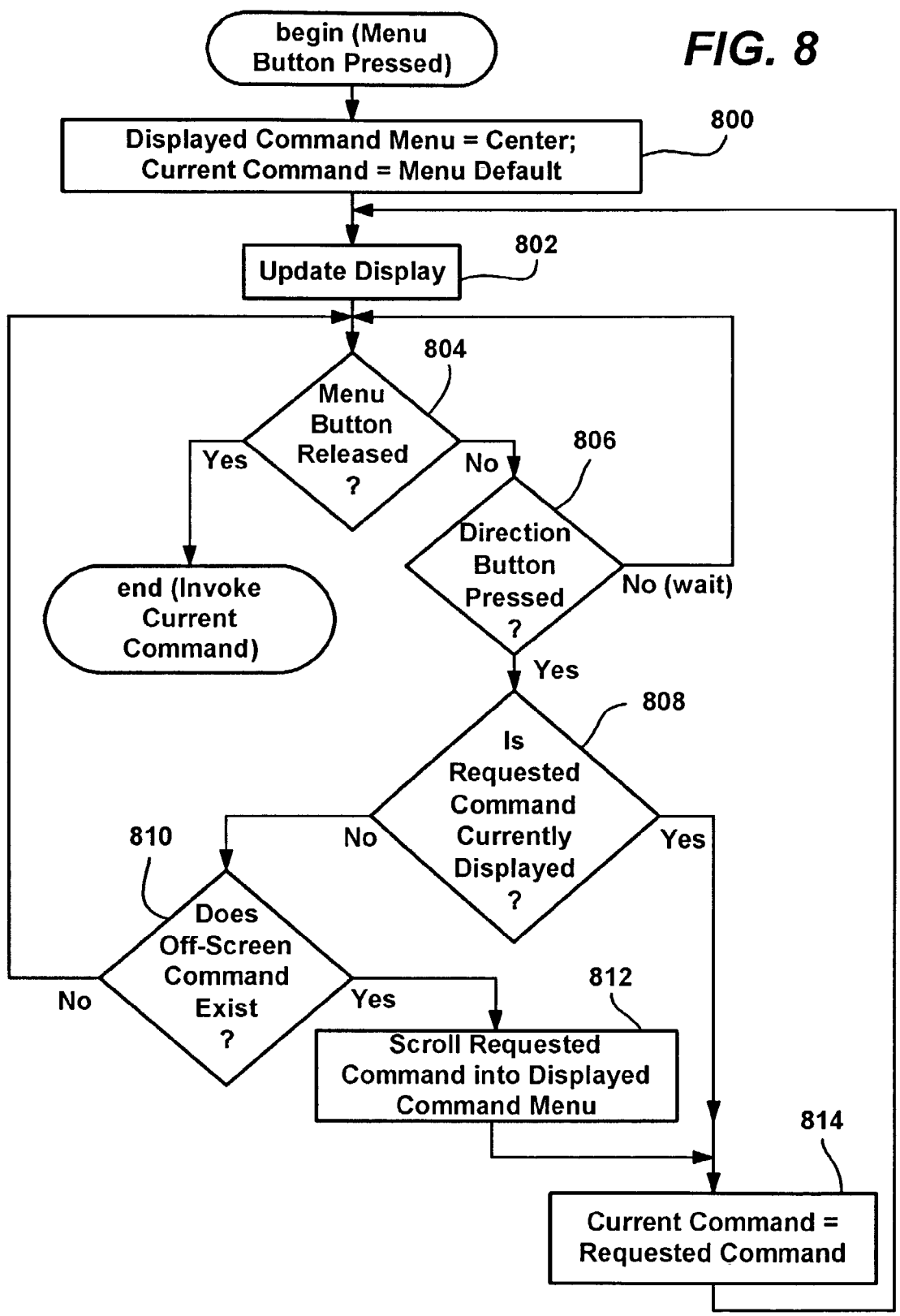
Figure 9:
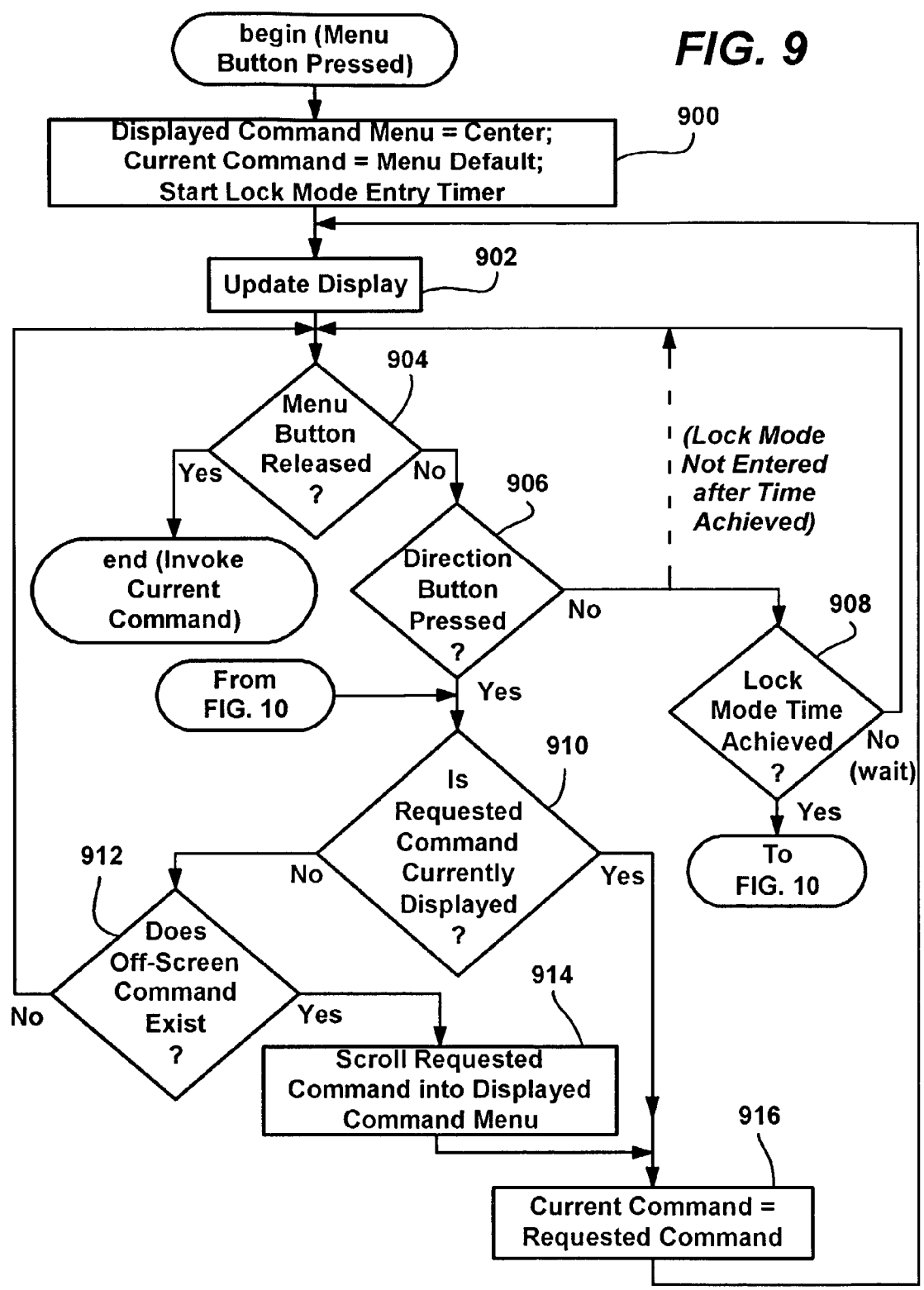
Figure 10:
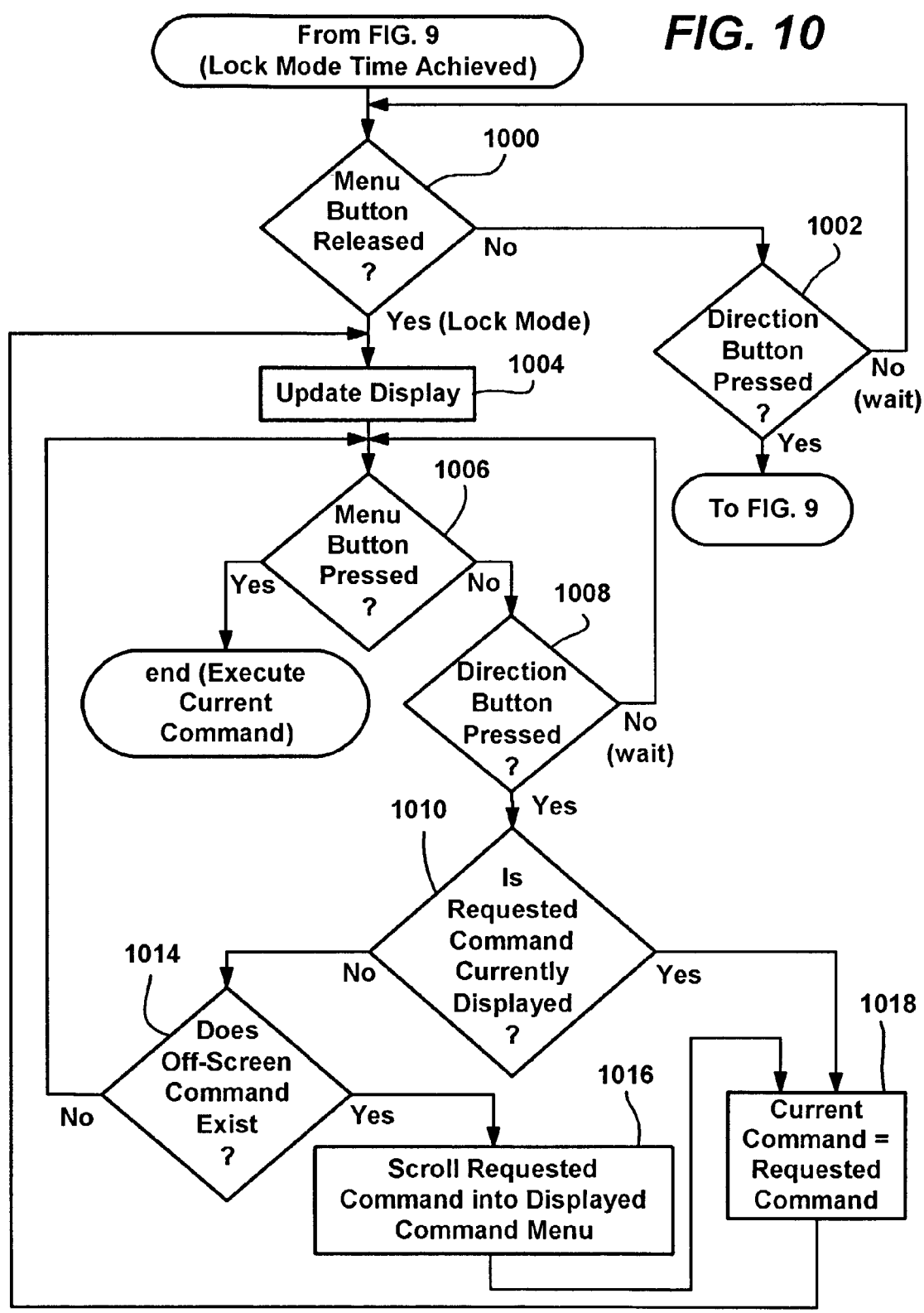
Figure 11:
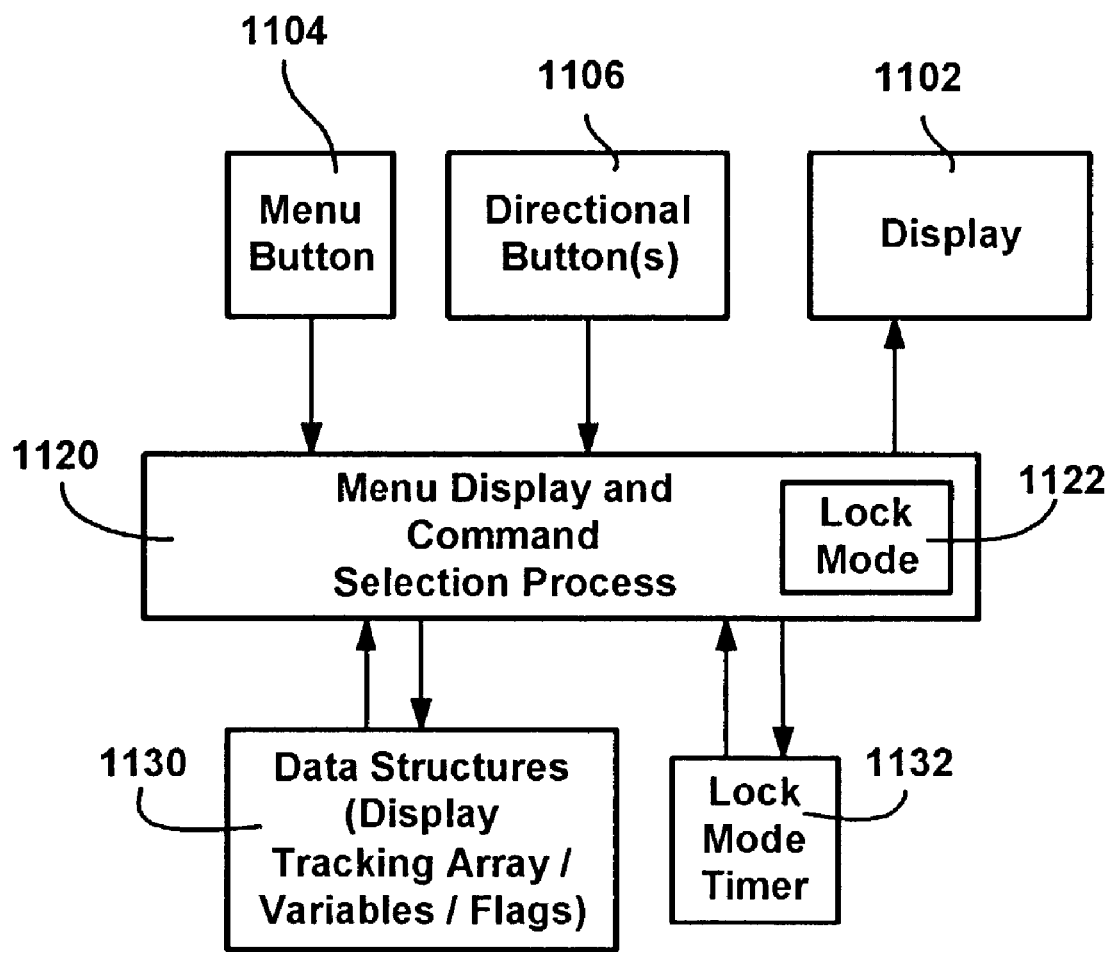

FIG. 8 is a flow diagram generally describing one suitable process for controlling navigation and command selection in a grid, in accordance with an aspect of the present invention;

FIGS. 9 and 10 comprise a flow diagram generally describing an alternative, lock-mode-capable process for controlling navigation and command selection in a grid, in accordance with an aspect of the present invention; and FIG. 11 is a block diagram representing exemplary components for implementing the flow diagrams of FIGS. 8-10 (or similarly suitable logic) in accordance with an aspect of the present invention.

DETAILED DESCRIPTION

Exemplary Operating Environment

Figure 1:
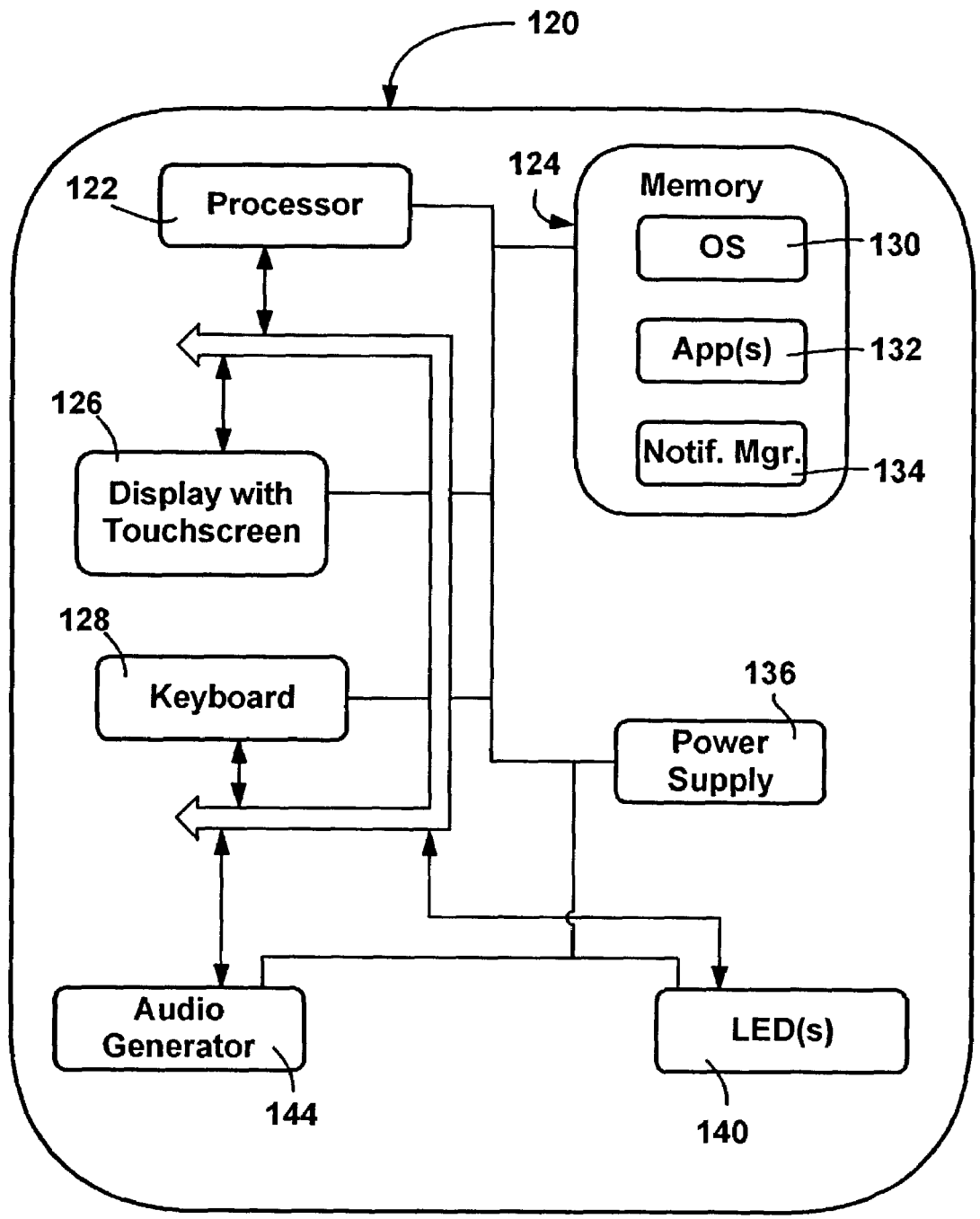
FIG. 1 is a block diagram representing one exemplary computing device into which the present invention may be incorporated.

FIG. 1 illustrates an example of a suitable operating environment 120 in which the invention may be implemented, particularly for decoding image and/or video data. The operating environment 120 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like. For example, it is likely that encoding image and/or video image data often will be performed on a computer with more processing power than contemporary hand-held personal computers, but there is no reason encoding cannot be performed on the exemplary device, or decoding on a more powerful machine.

The invention may be described in the general context of computer-executable instructions, such as program modules, executed by one or more computers or other devices. Generally, program modules include routines, programs, objects, components, data structures and so forth that perform particular tasks or implement particular abstract data types. Typically the functionality of the program modules may be combined or distributed as desired in various embodiments.

Computing device 120 typically includes at least some form of computer readable media. Computer-readable media can be any available media that can be accessed by the computing device 120. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 120. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

FIG. 1 shows functional components of one such handheld computing device 120, including a processor 122, a memory 124, a display 126, and a keyboard 128 (which may be a physical or virtual keyboard). The memory 124 generally includes both volatile memory (e.g., RAM) and non-volatile memory (e.g., ROM, PCMCIA cards, and so forth). An operating system 130 is resident in the memory 124 and executes on the processor 122, such as the Windows® CE operating system from Microsoft® Corporation, or another operating system.

One or more application programs 132 are loaded into memory 124 and run on the operating system 130. Examples of applications include email programs, scheduling programs, PIM (personal information management) programs, word processing programs, spreadsheet programs, Internet browser programs, and so forth. The handheld personal computer 120 may also include a notification manager 134 loaded in the memory 124, which executes on the processor 122. The notification manager 134 handles notification requests, e.g., from the application programs 132.

The handheld personal computer 120 has a power supply 136, which is implemented as one or more batteries. The power supply 136 may further include an external power source that overrides or recharges the built-in batteries, such as an AC adapter or a powered docking cradle.

The exemplary handheld personal computer 120 represented in FIG. 1 is shown with three types of external notification mechanisms: one or more light emitting diodes (LEDs) 140 and an audio generator 144. These devices may be directly coupled to the power supply 136 so that when activated, they remain on for a duration dictated by a notification mechanism even though the handheld personal computer processor 122 and other components might shut down to conserve battery power. The LED 140 preferably remains on indefinitely until the user takes action. Note that contemporary versions of the audio generator 144 use too much power for today's handheld personal computer batteries, and so it is configured to turn off when the rest of the system does or at some finite duration after activation.

Hardware Button Menu

Figure 2:
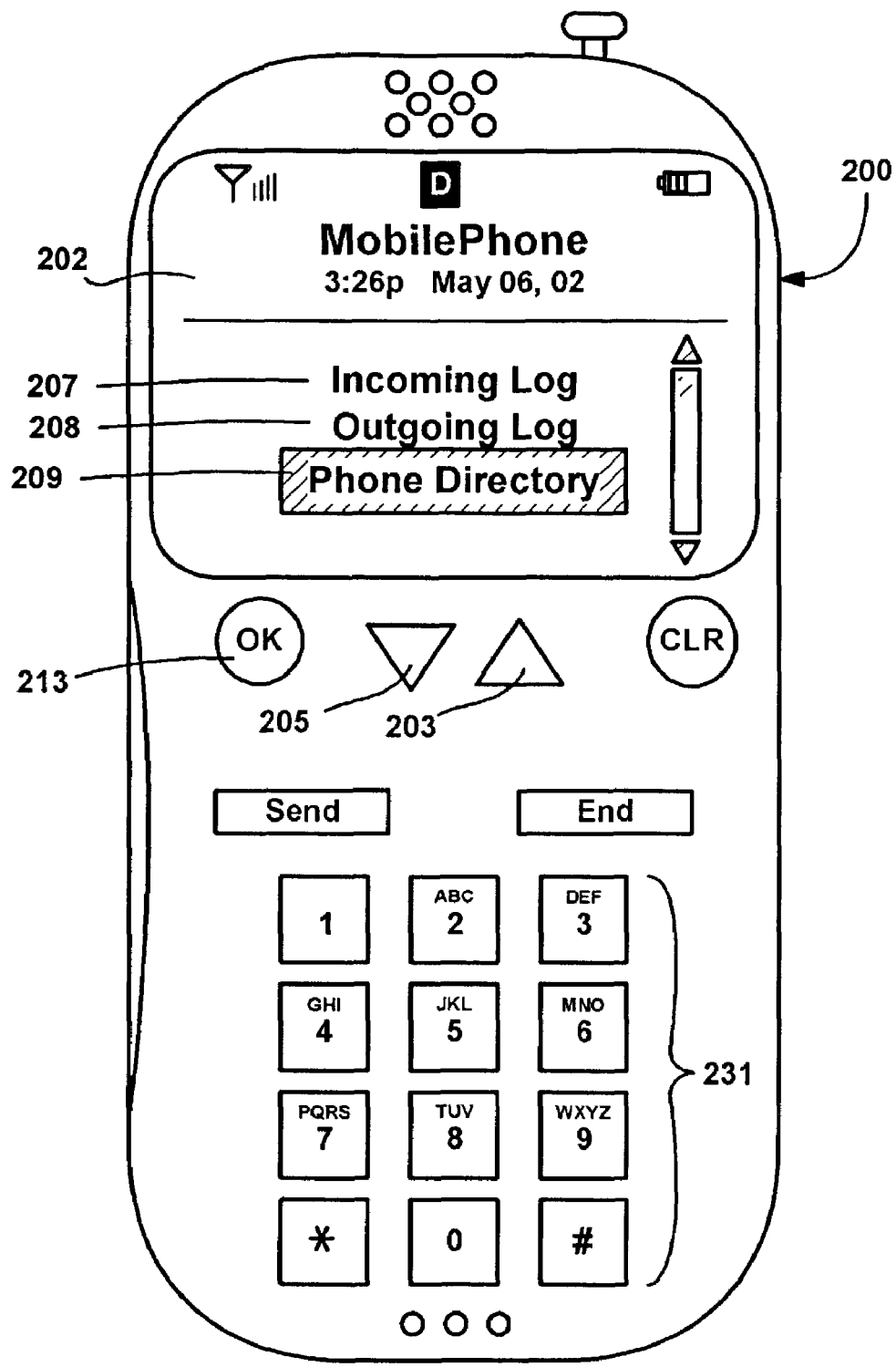
FIG. 2 is a simplified representation of a mobile telephone constructed in accordance with the prior art.

FIG. 2 is a representation of a conventional, prior art mobile telephone 200 having a display screen 202. As represented in FIG. 2, a user uses up and down buttons 203 and 205 to scroll vertically and highlight a selection (e.g., 209) of a plurality of displayed selections 207-209. Once highlighted, the user presses an OK button 213 or the like to invoke the selection, which typically takes the user to a similarly arranged sub-menu. Although only three selections are shown, there are frequently many more (e.g., on the order of ten to twenty) commands available in the main menu alone, including commands such as Messages, or Setup. For submenus of commands, such as to select a name from a user's telephone directory, there may be hundreds of such entries. As is understood, a significant amount of scrolling is often required to navigate such menus. Various shortcuts are sometimes provided, e.g., with lists of alphabetized names, pressing an appropriate one of the alphanumeric keys 231 in some devices may skip to ahead start scrolling the names from that letter. Although sometimes helpful, such shortcuts still require a user to perform a number of extra steps and are thus inconvenient, and a lot of scrolling may still be required, as many names begin with the same letter. The usage of such shortcuts is also not very intuitive.

Figure 3:
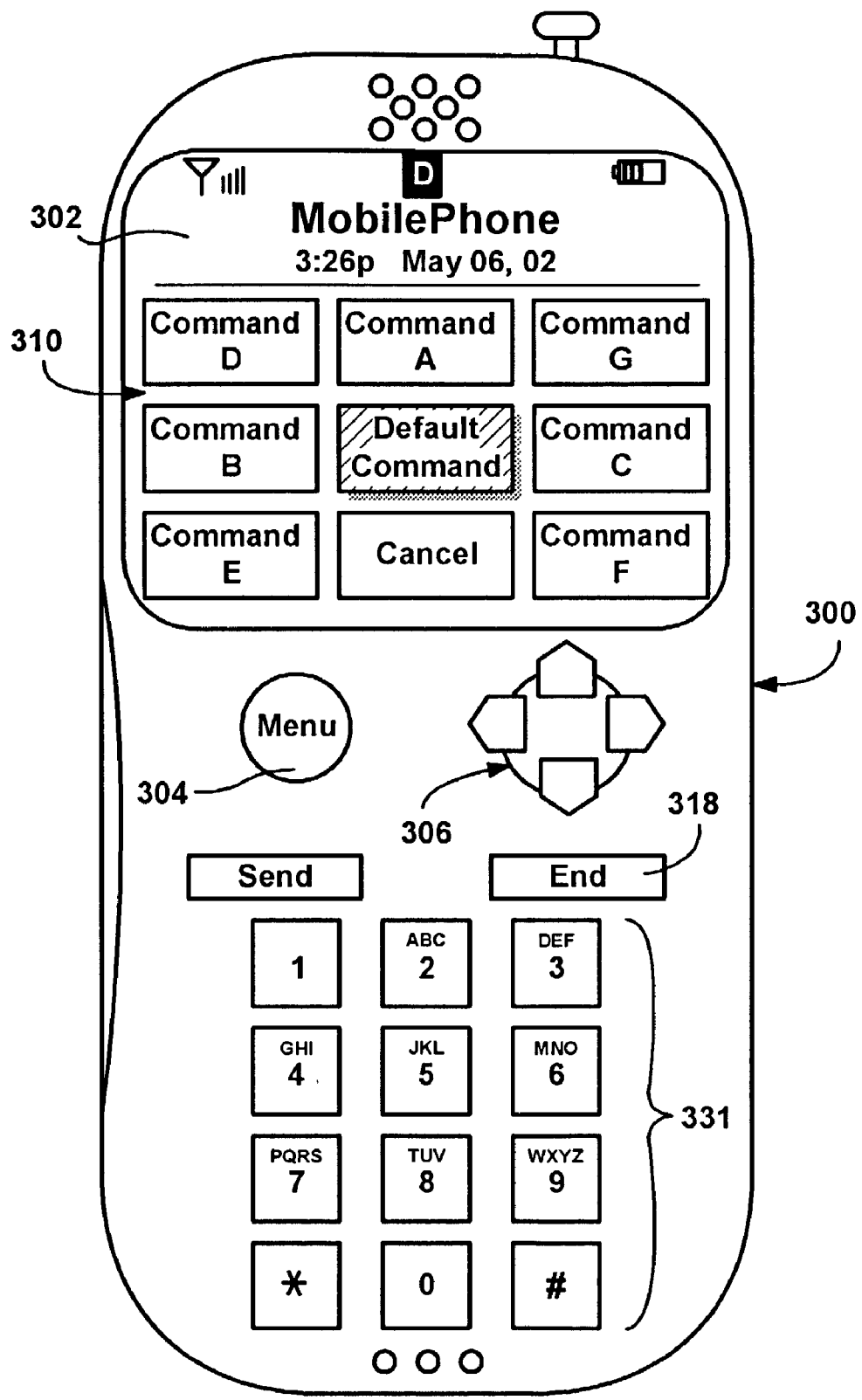
FIG. 3 is a simplified representation of a mobile telephone constructed in accordance with an aspect of the present invention.

FIG. 3 is a representation of a mobile telephone 300, with a display 302 arranged to have commands invoked in accordance with the present invention. FIG. 4 is a representation of a handheld computing device 400 (such as the device 120 described with reference to FIG. 1) with a display 402 similarly arranged. Both devices 300 and 400 include a menu button (or equivalent, labeled 304 and 404, respectively. Note that any hardware keyboard key in a keyboard mode would equivalently suffice as the menu button.

As represented herein, the mobile telephone 300 is constructed with a four-way control 306 (which may be a single four-way rocker switch or four separate buttons, corresponding to up, down, left and right), whereas the computing device 400 is constructed with an eight-way control 406, adding diagonal movement commands. As will be understood, the different controls and devices represented herein are for purposes of varying the examples, and the present invention may be implemented with virtually any control that allows movement in two-dimensions, and with any computing device. Further, in addition to being controlled by button actuation, the devices may or may not also be touch sensitive.

In accordance with one aspect of the present invention and as generally represented in FIG. 3, instead of a linear list of commands, the commands on the display 302 are presented to the user in the form of a two-dimensional grid 310, which the user activates and views by pressing and holding the menu button 304. On the display 402 of the computing device 400 (FIG. 4), the commands are similarly presented to the user in the form of a two-dimensional grid 410, activated and viewed by pressing and holding the menu button 404. It is also feasible to have a mechanism arranged to display the menu grid 310 (or 410), such as by default, but not have the menu grid 310 (or 410) be active until the menu button 304 (or 404) is pressed and held. To indicate a grid in an inactive state, for example, the inactive grid may be shown in a different color, grayed-out, and/or with no highlighted selection.

In FIGS. 3 and 4, a default command (labeled Default Command) is centered in the corresponding menu grid 310 or 410. For grids that have an even number of items in a row and/or column, e.g., a 4×3 grid, the default command may be placed elsewhere, such as near the center. The default command may be a command that the menu designer deemed to be the one most likely to be needed, although it is feasible to have the default command be dynamic, with a most frequently used algorithm or the like controlling what is displayed as the default, or have the default command be user-configurable. Similarly, the commands that are more likely to be used should be arranged so as to be selected with the fewest number of button pushes possible. Thus, it may be more advantageous to have the commands remain constant or mostly constant so that users can quickly memorize button patterns, e.g., menu button held plus "up" would be an easy to remember pattern, and thus it would make sense to design the menu so that the command selected by this pattern will be one that is likely to be used fairly often. Note that as used herein, the terms "command" and "commands" can be essentially any menu item that can be displayed, and are not limited to commands that when invoked perform some unique and/or definite function. For example, menu items may be duplicate commands or blanks, such as when there are not enough distinct commands in a given menu to complete a grid. Menu commands can also correspond to one or more letters or numbers, macros, and so forth.

In accordance with one aspect of the present invention, in one embodiment, releasing of the menu button (304 in FIG. 3, 404 in FIG. 4) invokes the selected command. This facilitates rapid selection of a command, with as little as one push-and-release of the menu button required to invoke the default command. Indeed, the menu need not even be displayed if the menu button is pressed and released fast enough. Note that it is essentially equivalent (although somewhat less convenient) to have more than one hardware menu button, e.g., with one button pressed as the first actuation that activates/displays the menu and another button pressed as the second actuation that invokes the current selection. Thus, as used herein, a "menu button," "menu button mechanism" or the like may be any hardware mechanism that enables distinct first and second actuations.

In FIG. 3, to select something other than the default command, while still holding the menu button 304, (or otherwise locking the device into a menu mode, described below), a user uses the four-way control 306 to move the pending selection. This chording technique changes the highlighting (or other indication) of the selection. If more commands are available than can be displayed, such commands may be scrolled into the display area when needed, e.g., when the user is requesting further directional movement to select a command that exists logically beyond the edge of the display. Once the desired command is highlighted, the menu button (and possibly the directional button) is released to make the selection, whereby the device invokes the command as appropriate, e.g., renders a new sub-menu for the selection, dials a telephone number, and so on.

The commands displayed in the grid 310 of FIG. 3 include some commands that require only one directional button (Command A, Cancel, Command B and Command C, corresponding to up, down, left or right, respectively) to be selected. Such commands are referred to as secondary commands, with the default command being considered the primary command. Because of the four-way switch, other commands, referred to as tertiary commands, require that two directional buttons be serially pressed to select them. For example, Command D, Command E, Command F and Command G are respectively selected by pressing up/left, down/left, up/right and down/right, in either order.

It should also be noted that in FIG. 3, the numeric keys 331 (1-9, *, 0 and #) are also in a two-dimensional layout, and thus spatially and intuitively relate to the displayed grid 310, at least in part. Accordingly, commands may be selected via the directional pad 306 and menu button 304, and also via the numeric keys 331. To facilitate use of the keys 331 for invoking commands, the various commands of the grid 310 can each display a number (not shown) identifying a corresponding keypad key, e.g., Command D can indicate that it may be also be invoked by pressing the 1 key on the keypad 331, Command A by the 2 key, and so on up to Command F corresponding to the 9 key.

Note that one of the selections is a Cancel command. The Cancel command enables the menu button 304 to be released without invoking a command. Preferably each menu grid (and sub-menu) will include at least one such Cancel command.

More than one may be provided, such as when scrolling, so that a Cancel command always appears regardless of how scrolled. Note that another hardware button such as the "End" button 318 (or at least one of the "Other" buttons such as the button 418 in FIG. 4) may operate to cancel command selection via the grid, whether or not a Cancel command is also provided in the grid.

FIGS. 5A-5E describe one way in which scrolling may be accomplished. In FIGS. 5A-5E, a 5×5 grid of commands 510 is available, however the display only shows a 3×3 subset of these commands. In FIGS. 5A-5E, the displayed 3×3 subset, labeled $540_A$-$540_E$ respectively, is represented by a solid box surrounding commands drawn with solid lines, while the available, but not displayed commands are shown surrounded by dashed lines. A dashed box surrounds the entire 5×5 grid, and the currently selected command is highlighted, indicated with slanted lines, and shadowed. Note that the in FIGS. 5A-5E, the solid box representing what is currently being displayed generally appears to move around, but does not, as in actuality what is presently displayed is logically moved into the corresponding display area. Further, note that although not necessary to the invention, the entire 5×5 grid of FIGS. 5A-5E is arranged such that at least one Cancel command selection is displayed to the user regardless of how scrolled.

Figure 5A:
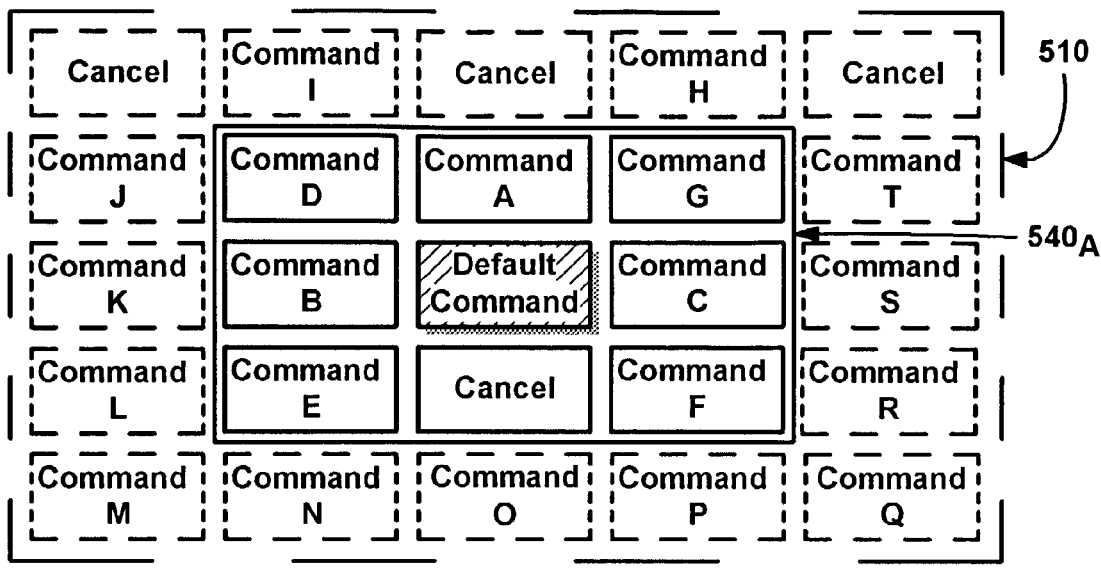
FIGS. 5A-5E are representations of an overall 5×5 grid of available commands representing scrolling to display a 3×3 subset menu of the commands arranged in accordance with an aspect of the present invention.
Figure 5B:
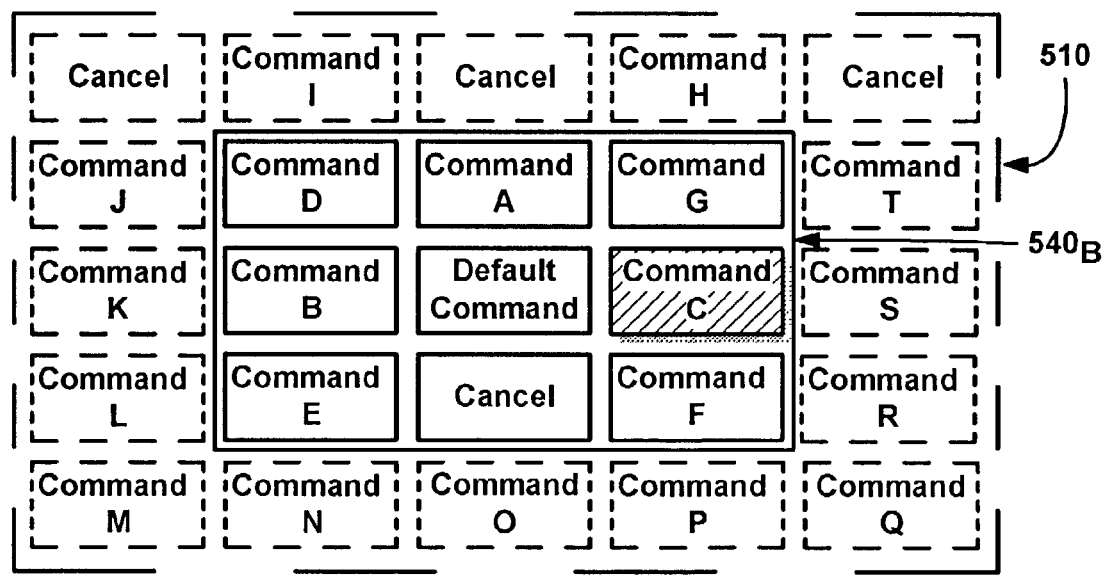

FIG. 5A shows the initially displayed menu $540_A$ which is a subset of the grid 510, with the default command initially and automatically selected and centered in the entire grid 510, in keeping with one preferred implementation described above. If the menu button is released at this time, the default command would be selected. FIG. 5B shows the user having changed the pending selection to Command C, accomplished via a right directional control button. Note that as represented in FIG. 5B, scrolling preferably does not occur, since Command C was visible, and thus the commands displayed in the subset $540_A$ and $540_B$ are the same, but with the pending command changed.

Figure 5C:
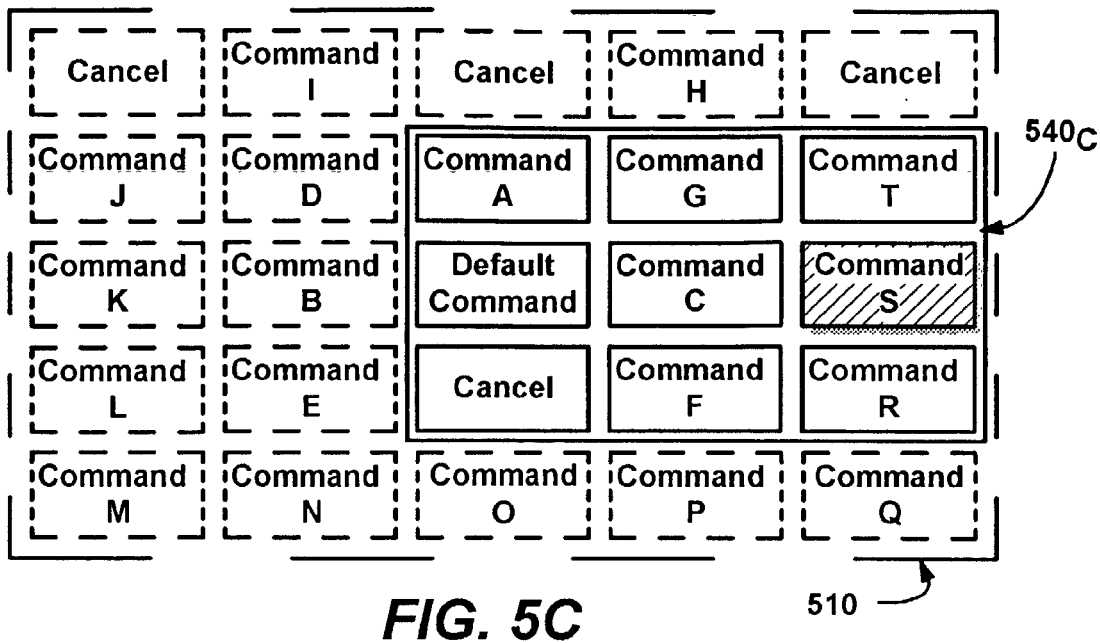

FIG. 5C shows the displayed subset menu $540_C$ of the complete grid 510 being logically scrolled into the display area, and the selection of Command S, which occurs when the user again actuates the right directional button. Scrolling right again at this time may be prevented, or it may result in the user circularly moving the selection to Command K, or moving/scrolling up or down. For purposes of simplicity, scrolling while at the logical scroll limit will be described as being prevented by the system.

Figure 5D:
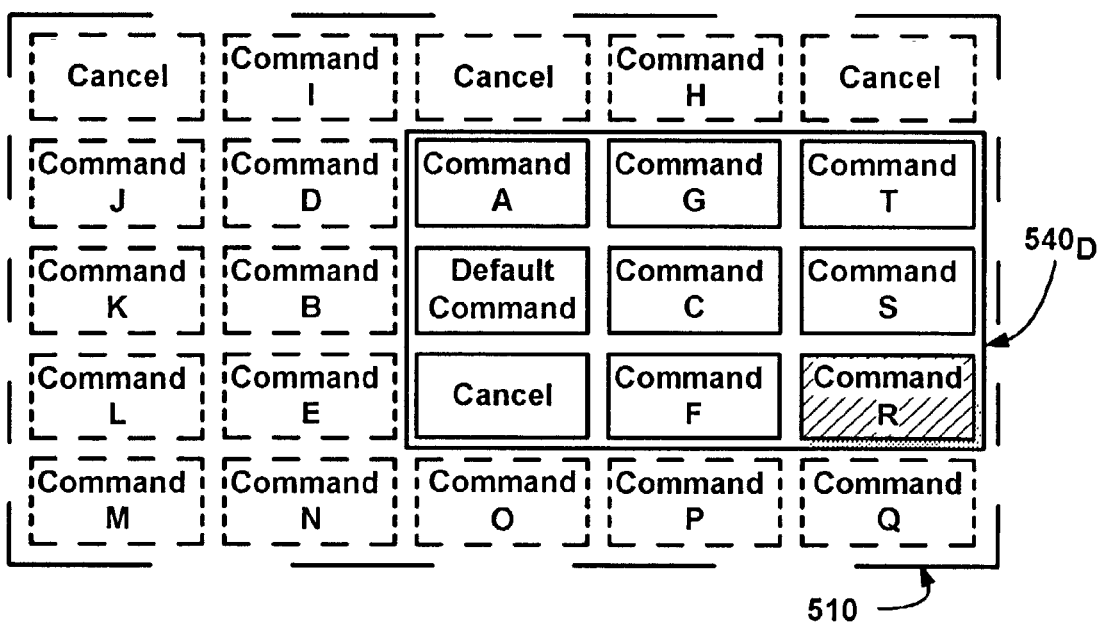
Figure 5E:
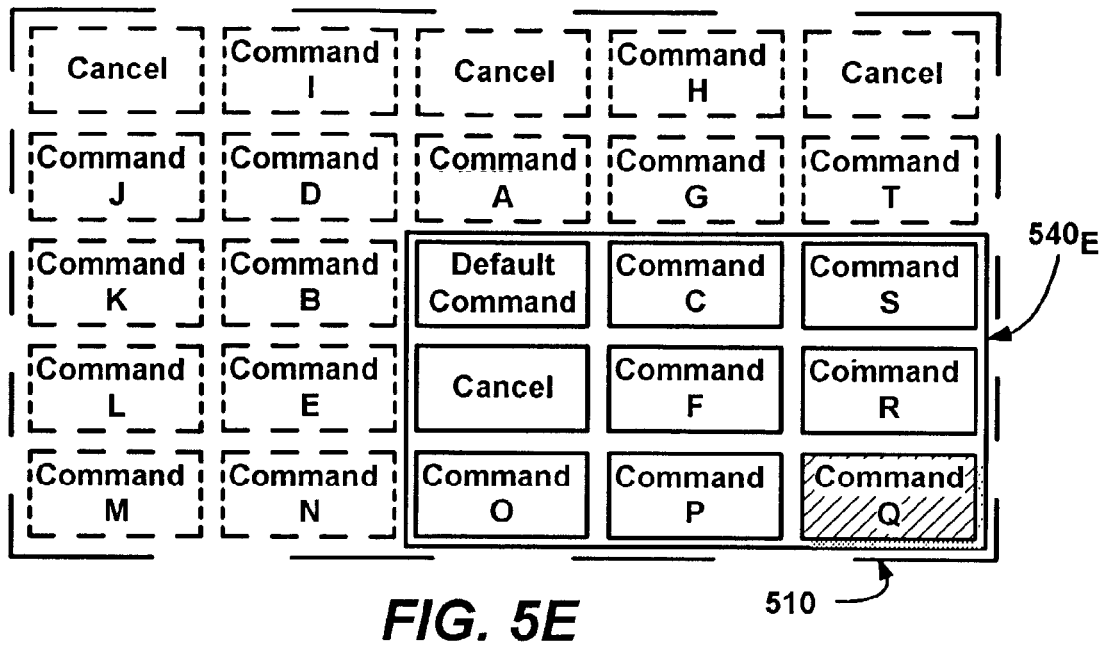

FIGS. 5D and 5E show the results of two down directional buttons having been pressed following the state shown in FIG. 5C, pressed once to result in the state represented in FIG. 5D, and pressed once more to result in the state represented in FIG. 5E. FIG. 5D does not scroll since Command R was already displayed, while FIG. 5E scrolls to display a new subset $540_E$ in order to enable the requested selection of Command Q. Note that slider mechanisms (FIG. 6A) 601-602, and/or a map 604 (FIG. 6B) may be employed to provide a visual indication to the user of where the user has scrolled to a subset 640 within the overall grid, and/or to assist with navigation therein. For example, the mechanisms 601, 602 and 604 represented in FIGS. 6A and 6B may be used to indicate that the user has scrolled to the lower right corner of the overall grid, as in the state represented in FIG. 5E.

Returning to FIG. 4, FIG. 4 represents an example computing device 400 that is physically different from the mobile telephone device 300 of FIG. 3, yet operates similarly with respect to menu selection. However, because of the eight-way directional control button 406, it is possible to move diagonally to select any one of the commands, labeled Command D, Command E, Command F or Command G. Thus, in this alternative, such diagonally-positioned commands are secondary commands, not tertiary commands, although it is also possible to select such a command using a combination two-step horizontal and vertical button press instead of a one-step diagonal press. As used herein, secondary means a minimum of one step away from the current position, while tertiary means two steps away, regardless of whether the user actually moves the selection in this direct manner. FIG. 7 shows a grid 710, which generally corresponds to the grid 410 of FIG. 4 after a single diagonal (up and right) button press has changed the pending command selection from the Default Command to Command G.

It should be noted that any grid can have duplicate commands, such as the multiple Cancel commands represented in FIGS. 5A-5E. A grid may also have one or more commands omitted therefrom, such as by showing a blank or grayed-out space instead of a command and preventing selection of that space, or showing a command as "No operation" or the like can be selected, but when invoked, has no effect. In FIG. 7, Command D is shown with a dashed box around it to indicate that the command may or may not be present, or if present, may have a different appearance, wherein the user may be prevented from selecting Command D or Command D may have no associated function or a special function. For example, one such special function may correspond to a lock mode command that enters the device into a lock mode state, described below.

Turning to an explanation of the present invention with particular reference to the flow diagrams of FIGS. 8-10 and the block diagram of FIG. 11, FIG. 8 shows one way in which the hardware buttons in combination with a two-dimensional grid of menu commands may be operated to facilitate user command selection. Note that this is only an example of a suitable process and components for purposes of describing the operation and structure, and there are many equivalent ways and components to accomplish the general logic. Further note that the components in FIG. 11 may be the same as like components represented in FIG. 3 or FIG. 4, or may be components on a different device.

Step 800 of FIG. 8 begins when the menu button 1104 of FIG. 11 is pressed, and represents initializing the display 1102 and initializing the currently pending command to the Default Command. Step 802 represents updating (or if already properly displayed, activating) the display 1102, although as described above, this may be temporarily deferred to avoid rendering the display 1102 if the user very quickly presses and releases the hardware menu button 1104.

Step 804 tests whether the menu button 1104 of FIG. 11 has been released. If so, the process would end, and the currently selected command, which at this time would be the Default Command, would be invoked. Note that this might result in the default command being executed, and/or invoking a sub-menu (which may similarly comprise a command grid) that is displayed for further sub-selection in a similar manner, or the performance of other types of functions.

If at step 804 of FIG. 8 the menu button 1104 is still being pressed, step 806 represents testing whether one of the directional buttons 1106 has been pressed. If not, step 806 loops back until either the menu button 1104 is released or a directional button is pressed. Note that steps 804 and 806 need not actually be in such a loop, as such a process 1100 often will be event driven and thus block waiting for the appropriate button event, whereby the device and/or process can perform other activities while waiting. Further note that other hardware buttons may be pressed that may impact the process 1120, e.g., a hardware cancel button may exist so that the user can exit via hardware instead of (or in addition to) requiring a menu selection to cancel.

At some point, the menu button 1104 will be released as detected by step 804, or one of the directional buttons 1106 pressed as detected by step 806. When a directional button is pressed, step 808 evaluates whether the requested command to-be-selected is currently shown on the display. To this end, data structures 1130 such as a data array that matches the grid and/or other suitable data structure or structures can track which subset (if any) of the available commands are being displayed and which are not. The same array or one or more other variables can track which command is currently selected.

For example, the following matrix may be used to store data regarding the selection and grid display of the 5×5 grid of FIG. 5E, wherein the first digit in each pair represents visible (=1) or not (=0), and the second digit in each pair indicates whether the corresponding command is currently selected (=1) or not (=0):

$$\begin{bmatrix} 0,0 & 0,0 & 0,0 & 0,0 & 0,0 \\ 0,0 & 0,0 & 0,0 & 0,0 & 0,0 \\ 0,0 & 0,0 & 1,0 & 1,0 & 1,0 \\ 0,0 & 0,0 & 1,0 & 1,0 & 1,0 \\ 0,0 & 0,0 & 1,0 & 1,0 & 1,1 \end{bmatrix}$$

If the requested command is currently being shown on the display 1102, scrolling is not needed, whereby step 808 branches to step 814 to change the current (pending) command to the newly selected one, e.g., updating the array and/or other variables in the data structure 1130, and returning to step 802 to update the display 1102 to reflect the new selection. Otherwise, scrolling may be possible, as evaluated by step 810. If not, e.g., a scroll limit has already been reached (the user has scrolled to the end of the total grid and circular or other scrolling is not allowed), step 810 returns to step 804, essentially ignoring the request. Note that a beep, visual indication or other alarm may be first provided to inform the user of the scroll limit having been reached.

If step 810 determines that scrolling is possible, step 810 branches to step 812 to scroll the requested command into the displayed (subset) command menu. Again, this may be accomplished by adjusting the values in the array or the like, and using the array values to map to what is displayed. Step 812 continues to step 814 to change the current pending command, as described above, and returns to step 802 to update the display 1104 to reflect the scrolling and the new selection.

FIGS. 9 and 10 provide an alternative enhancement that may be used, for example, to facilitate one-handed operation of the device. To this end, instead of the release of the menu button 1104 acting as its secondary actuation, the device can be placed in a lock (or lock down) mode 1122 of operation, in which the menu button 1104 may be released and not secondarily actuated until pressed again to invoke the currently pending selection. Thus, as used herein, in either implementation the menu button 1104 is initially and then secondarily actuated, but the second actuation may be accomplished in different ways (e.g., released in a regular mode, or pressed a second time if in the lock mode).

FIG. 9 describes one way in which the lock mode 1122 can be incorporated into the regular mode, e.g., as described above with reference to FIG. 8. For example, when initially actuated, the process 1120 operates generally the same to initialize the array and/or variables at step 900, and further starts a lock mode timer 1132. In general, if the menu button 1104 is held for some substantial, predetermined or user configurable time period (e.g., two seconds), and then released without a directional button having been pressed during that period, the lock mode 1122 is entered. Thus, in FIGS. 9 and 10, two things are required to achieve entering of the lock mode 1122, namely holding the menu button 1104 for the required duration, and then releasing it before any directional button 1106 is pressed. Alternatively, (not shown), once held for the appropriate duration without a directional button having been pressed, the lock mode 1122 can be entered, regardless of whether it is released before or after the pressing of a directional control button.

Step 902 updates the display 1102 of FIG. 11 as generally described above, and step 904 tests for the release of the menu button 1104. If released before lock mode 1122 was entered, the current command is invoked, e.g., as in the regular mode. Otherwise a directional button is tested for at step 906. However, instead of returning when no directional button is pressed, another test regarding whether the lock mode time has been achieved by the lock mode timer 1132 occurs at step 908. Note that the lock mode duration should be far longer than the device takes to executed steps 900-906, whereby there is no way to reach the lock mode time before the user has had at least a reasonable chance to release the menu button 1104 and make a selection in the previously described manner and/or press a directional button. In this manner, the process operates as before, unless and until the lock mode 1122 is entered.

If a directional button is pressed before the lock mode time has been reached, steps 910-916 operate in the same general way as the similar steps described above with reference to FIG. 8, and thus these steps will not be described again for purposes of brevity.

If the lock mode time is achieved at step 908, the process continues to step 1000 of FIG. 10, where a test is performed to determine if the menu button 1104 has been released. As described above, to ensure that the user really wants to enter the lock mode 1122, in this alternative, the menu button 1104 needs to be released before any of the directional buttons 1106 are pressed, regardless of how long the menu button 1104 was held down before the directional button was pressed. Although it is alternatively feasible to base the lock mode determination solely on holding time (without another selection being made), requiring both a holding time and an actual release before another selection is made seems more consistent with one-handed operation, which is one reason for having a lock mode. Note that the choice between these alternatives and others may be user configurable. Further, note that other mechanisms for entering the lock mode are feasible, such as by displaying in the grid a lock mode command that is easy to select, even by one-handed operation, e.g., a menu button press and release followed rapidly by a left directional arrow may be considered a switch to the lock mode (instead of immediately treating the release as selection of the default command). With such an alternative mechanism, to select the default command, the user would release the menu button but then not press the directional button right after the release.

In the described implementation (in which the menu button 1104 needs to be held for the appropriate time and released before any directional button is hit to enter the lock mode), if the menu button 1104 has not been released at step 1000, step 1000 branches to step 1002 to determine whether the user has pressed one of the directional buttons 1106. If so, the lock mode 1110 is not successfully entered, and the process returns to FIG. 9, step 910. If at step 1002 a directional button has not been pressed, the process 1120 loops or otherwise waits for one of these two button actions to occur. Note that once the lock mode time has been achieved at step 908, but the lock mode was not entered because a directional button 1106 was pressed before release of the menu button 1104, in one implementation the process will not again attempt to enter the lock mode, as indicated by the dashed line from step 906 back to step 904. A flag or the like can track this time-achieved, but lock-mode-not-entered state. In other implementations the lock mode could be re-entered by continuing to hold the menu button 1104 for a sufficient time without selecting a directional button.

Eventually in FIG. 10, either the menu button 1104 is released at step 1000, or a directional button 1106 is pressed at step 1002. If first released, the lock mode 1122 is entered, and step 1000 branches to step 1004 to update the display 1102 if desired, such as to indicate to the user the state change into the lock mode 1122. Note that an audible sound may also be output to indicate initial entry into the lock mode, and that step 1000 may bypass step 1004 if no such visible indication is made.

At this time, steps 1006-1018 operate in the same general way as the similar steps described above with reference to FIG. 8, but with one difference, namely that the secondary actuation that is required to invoke the currently selected command is now a button press at step 1006, not a button release. Thus, selection and scrolling may be the same as in the regular mode of operation, the display 1102 will be updated as appropriate, and so on, however in this mode, pressing (not releasing) of the (already-released) menu button 1104 is detected as the second actuation that invokes the selected command. Note that instead of detecting only the subsequent press, a full press-and-release of the menu button 1104 may instead be required to actuate, and indeed, a second press and hold for a sufficient time may even be used for another purpose, such as to exit the lock mode and return to regular non-locked operation.

As can be seen from the foregoing detailed description, there is provided a method and system that facilitates rapid hardware button selection of a large number of menu commands. For example, with an eight way directional control, any one of nine commands can be selected with at most one directional control button press, and any one of twenty-five commands can be selected with at most two directional control button presses. The grid provides similar exponential benefits with a four-way control. The method and system are flexible, may be varied and/or otherwise customized to meet a variety of scenarios, are intuitive to use and provide numerous advantages over prior art mechanisms.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computing device, a method comprising:
   receiving a first actuation of a menu button mechanism, the actuation comprising depressing the menu button;
   after receiving the first actuation of the menu button mechanism, activating a menu that includes a two-dimensional grid of commands, wherein the menu, including the two-dimensional grid, is activated in response to receiving the first actuation of the menu button mechanism;
   for the first actuation of the menu button mechanism, selecting which of two or more possible menu related commands to execute, based on a duration during which the menu button remains depressed, including:
   following depression of the menu button and the subsequent activation of the menu that includes the two-dimensional grid of commands, waiting for a next event that is either a release of the menu button or a timeout during which the menu button remains depressed, wherein the timeout is an elapse of a predetermined amount of time from the depression of the menu button without the menu button being released; and
   selecting a menu related event for a single depression of the menu button such that:
   when the next event is a release of the menu button, invoking a selected command in the two-dimensional grid; and
   when the next event is a timeout during which the menu button is not released within the predetermined amount of time, ignoring any subsequent release of the menu button and locking the menu to maintain the two-dimensional grid of commands active, such that any release after the predetermined amount of time locks the menu.

2. The method of claim 1 wherein the menu button mechanism comprises a single hardware key which is not on a touch screen display, wherein receiving a first actuation comprises receiving an indication that the key was pressed, and wherein receiving a second actuation comprises receiving an indication that the key was released.

3. The method of claim 1 wherein activating the two-dimensional grid of commands comprises displaying the grid.

4. The method of claim 3 wherein the two-dimensional grid is activated with omitted commands.

5. The method of claim 1 further comprising, selecting a default command as the selected command upon activating the two-dimensional grid of commands.

6. The method of claim 5 wherein the default command is centered within the two-dimensional grid of commands.

7. The method of claim 1 further comprising, receiving an actuation of a directional control button, and in response, changing the selected command to another command.

8. The method of claim 7 further comprising, updating a display to indicate that the other command is the selected command.

9. The method of claim 7 further comprising, updating a display to scroll to a subset of commands in the grid.

10. The method of claim 9 further comprising, outputting visual information indicative of where the user has scrolled within the grid.

11. The method of claim 9, further comprising, providing a user of the computing system with an indicator when a scroll limit has been reached.

12. The method of claim 1 wherein the selected command within the two-dimensional grid of commands corresponds to a cancel command, and wherein invoking the selected command comprises deactivating the two-dimensional grid of commands.

13. The method of claim 1 wherein when the next event is a timeout, allowing invocation of the selected command by a second depressing of the menu button.

14. A computer-readable storage medium storing computer-executable instructions for performing the method of claim 1.

15. The method of claim 1 further comprising providing to a user of the computing device an indicator that the two-dimensional grid has entered into lock mode.

16. The method of claim 1 wherein a command displayed in the two-dimensional grid of commands, when invoked, places the two-dimensional grid of commands in lock mode.

17. The method of claim 1 wherein the set of at least one directional control button comprises a set of numeric keys, and wherein each command in the two-dimensional grid of commands displays a number corresponding to one key of the set of numeric keys which can be used to select the command.

18. In a computing device, a system comprising:
 a menu button mechanism configured to indicate actuations thereof;
 a set of directional control buttons each configured to indicate requests to move in a direction associated with at least one of two dimensions:
 a display having a two-dimensional grid of menu commands represented thereon, the two-dimensional grid being activated upon depression of a menu button of the menu button mechanism; and
 a process that operates on the depression of the menu button of the menu button mechanism, the process connected to receive indications of at least one other actuation from the menu button mechanism and to receive from the set of directional control buttons indications of requests to move and select a menu command from the two-dimensional grid of menu commands, the process being configured to:
  1) control the display output to represent a selected one of the menu commands in the grid;
  2) following activation of the two-dimensional grid of commands, select which of three or more possible menu related commands to execute for a single depression of the menu button, selection being based at least in part on a duration during which the menu button remains depressed, including waiting for a next event, wherein the next event is either a release of the menu button, a request to move received from the set of directional control buttons, or a timeout, wherein the timeout is an elapse of a predetermined amount of time from the depression of the menu button and without the menu button being released;
  3) enable invocation of the selected one of the menu commands in the grid; and
  4) respond to the next event such that:
 when the next event is a release of the menu button, allowing invocation of the selected command in the grid;
 when the next event is a request to move received from the set of directional control buttons, changing the selected menu command to select a different command in the grid; and
 when the next event is a timeout during which the menu button is not released within the predetermined amount of time, ignoring any subsequent release of the menu button and locking the menu to maintain the two-dimensional grid of commands active, such that any release after the predetermined amount of time locks the menu.

19. The system of claim 18 wherein the process initially selects a default command as the selected command.

20. The system of claim 19 wherein the default command is centered within the two-dimensional grid of commands.

21. The system of claim 20 wherein the process further controls the display to output visual information indicative of the position of the subset that is displayed with respect to the grid.

22. The system of claim 18 wherein the grid has more commands available than are displayed, and wherein the process scrolls a subset of commands into the display.

23. The system of claim 18 wherein the selected command from the two-dimensional grid of menu commands corresponds to a cancel command.

24. The system of claim 18 wherein when the next event is a timeout, the process enables invocation of the selected one of the menu commands by a second pressing of the menu button.

25. The system of claim 18 wherein the grid comprises a three-by-three menu of commands.

26. The system of claim 18 wherein the grid comprises a menu of commands in which only a subset thereof is displayable at one time, the process configured to scroll the subset into the display based on the move request received from the directional control button set.

27. The system of claim 18 wherein the set of directional control buttons comprises a four-way control that indicates each request to move as a request to move in an up, down, left or right direction.

28. The system of claim 18 wherein the set of directional control buttons comprises an eight-way control that indicates each request to move as a request to move in an up, down, left, right, up/left, down/left, up/right or down/right direction.

29. The system of claim 18 further comprising a plurality of physical keys in a two-dimensional arrangement, wherein the process relates at least some of the physical keys to at least some of the menu commands in the grid.

30. In a computing device, a method comprising:
 receiving first information indicating that a menu button has been depressed;
 in response to receiving the first information, and while the menu button is being held in a depressed state, activating a two-dimensional grid of commands and displaying a first subset of the two-dimensional grid of commands, including one default command highlighted as a selected command and one cancel command, the two-dimensional grid of commands being scrollable to scroll the first subset based on a move request received from a directional control mechanism;
 receiving, via the directional control mechanism, at least one request to change the selection of the selected command, and in response, changing the selection of the selected command and updating the displayed grid to highlight the changed selection;
 receiving, via the directional control mechanism, at least one move request to scroll the subset of the two-dimensional grid of commands to display a second subset of the two- dimensional grid of commands, wherein the second subset of the two-dimensional grid of commands includes a cancel command, and wherein the full two-dimensional grid of commands has a plurality of cancel commands therein such that regardless of the subset of the two- dimensional grid of commands that is displayed, at least one cancel command is always displayed;
 selecting which of three or more possible menu related commands to execute for a single depression of the menu button selection being based at least in part on a duration during which the menu button remains depressed, including waiting for a next event wherein the next event is either a release of the menu button, a request to move received from the set of directional control buttons, or a timeout, wherein the timeout is an elapse of a predetermined amount of time from the depression of the menu button and without the menu button being released; and responding to the next event such that:

next event is a release of the menu button, allowing invocation of the selected command highlighted in the grid;

when the next event is a request to move received from the set of directional control buttons, changing the selected menu command or scrolling the two-dimensional grid; and when the next event is a timeout during which the menu button is not released within the predetermined amount of time, ignoring any subsequent release of the menu button and locking the menu to maintain the two-dimensional grid of commands active, such that any release after the predetermined amount of time locks the menu, wherein locking the menu includes providing a visual indicator that the menu is in a lock mode.

31. The method of claim 30 wherein the default command is initially centered in the displayed grid.

32. The method of claim 30 further comprising, deactivating and removing from the display the two-dimensional grid of commands in response to receiving the second information indicating that the menu button has been released.

33. A computer-readable storage medium storing computer-executable instructions for performing the method of claim 30.

* * * * *